F. B. PFEIFFER.
GAS TURBINE.
APPLICATION FILED FEB. 19, 1916.

1,210,831.

Patented Jan. 2, 1917.
2 SHEETS—SHEET 2.

Witnesses

F. B. Pfeiffer  Inventor by

Attorneys

UNITED STATES PATENT OFFICE.

FRED BROWN PFEIFFER, OF AKRON, OHIO.

GAS-TURBINE.

1,210,831. Specification of Letters Patent. Patented Jan. 2, 1917.

Application filed February 19, 1916. Serial No. 79,445.

*To all whom it may concern:*

Be it known that I, FRED B. PFEIFFER, a citizen of the United States, residing at Akron, in the county of Summit and State of Ohio, have invented a new and useful Gas-Turbine, of which the following is a specification.

The present invention appertains to gas turbines, and aims to provide a novel and improved turbine using combustible gas as the motive fluid.

It is the object of the invention to provide a gas turbine which is extremely simple and inexpensive in construction, and which at the same time is practical and efficacious in use, the turbine having but few parts and eliminating all relatively movable parts with the exception of a rotor and gas supplying means.

The present turbine operates on the principle of the æolipile or Hero's steam toy, and the only relatively movable parts which need be lubricated are remote from the zone of combustion, whereby the lubricant will not be burnt, and which also facilitates the lubrication of the wearing parts.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1:
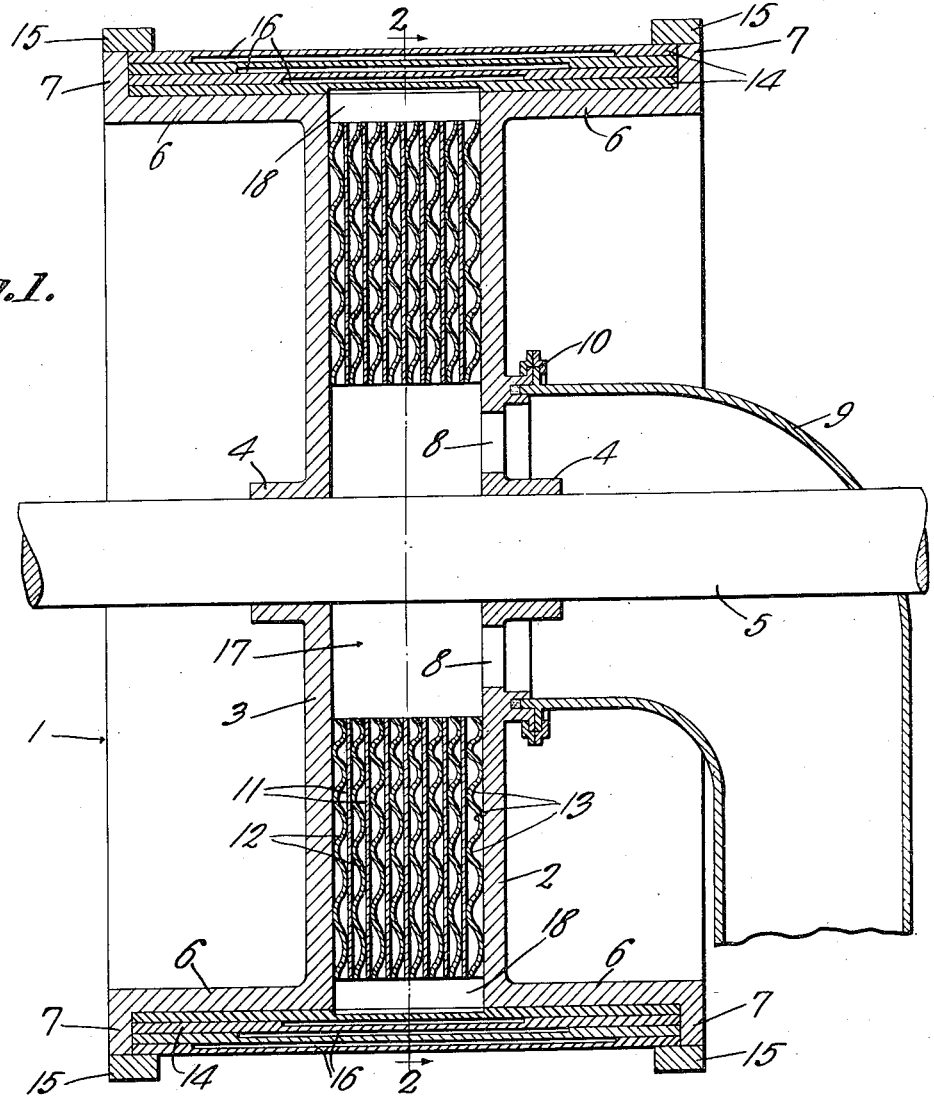
Figure 4:
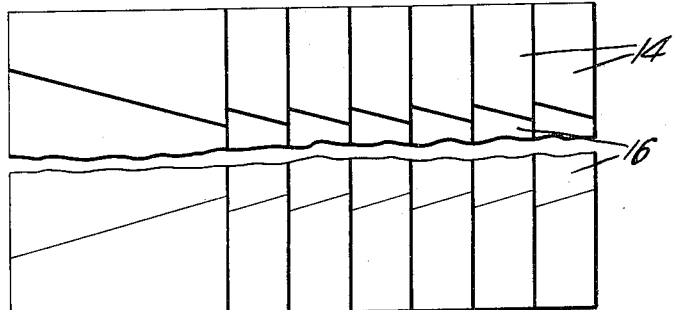
Figure 2:
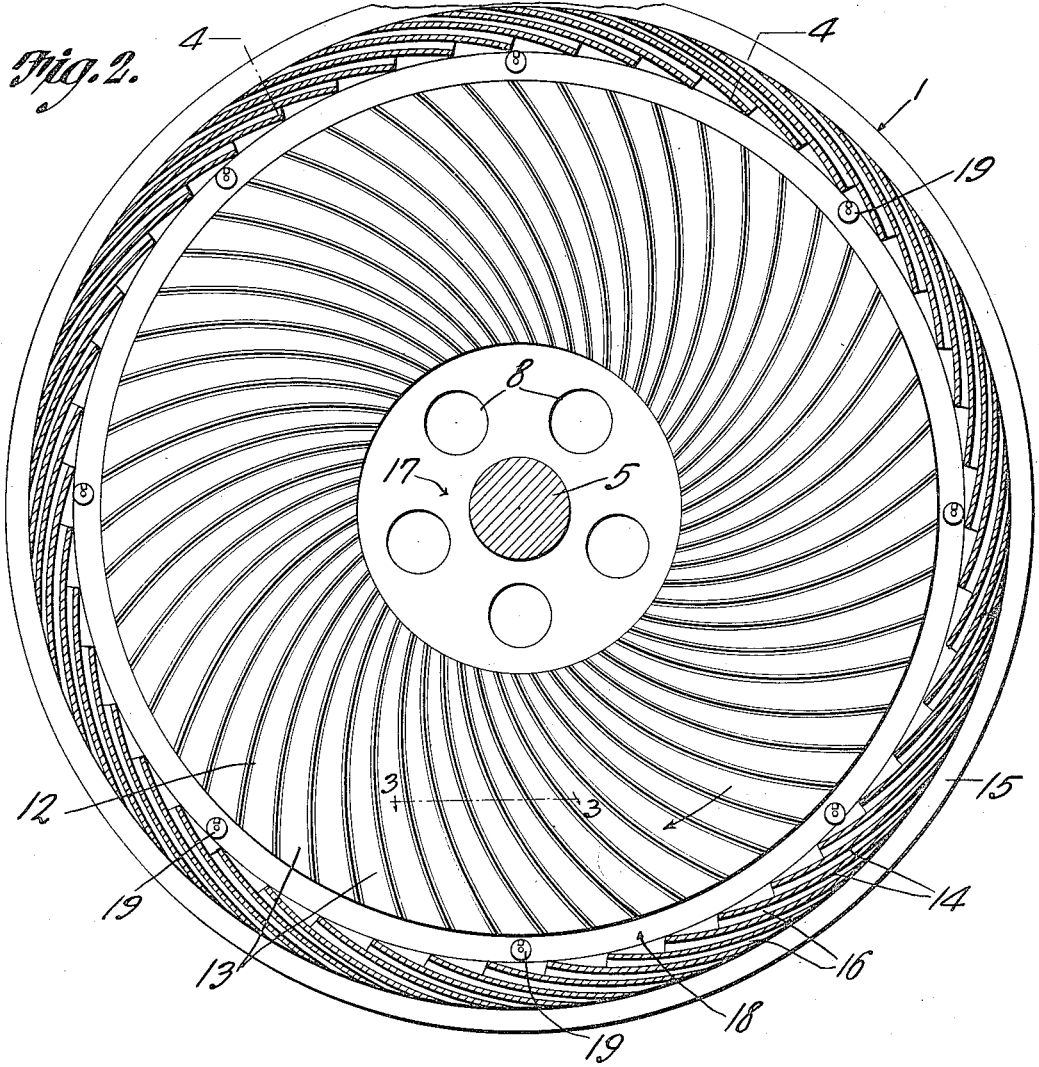
Figure 3:
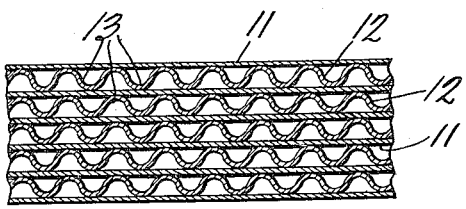

Figure 1 is a diametrical section through the rotor. Fig. 2 is a section on the line 2—2 of Fig. 1. Figs. 3 and 4 are enlarged sectional details, taken on the lines 3—3 and 4—4, respectively, of Fig. 2.

The rotor is designated generally by the numeral 1, and its body is preferably cast from metal, and may be of any size. The body of the rotor embodies parallel spaced disks 2 and 3 having the central hubs 4 secured upon a shaft 5 mounted for rotation in any suitable manner, and the peripheries or margins of the disks 2 and 3 are provided with outturned rims 6 projecting away from one another and forming the rim of the rotor body. The rims 6 are provided at their remote edges with outturned annular flanges or lips 7, and the disk 2 is provided adjacent its hub 4 with openings 8 for the inlet of the gas into the rotor.

The gas is supplied to the rotor by means of a suitable pipe or conduit 9 having one end connected by suitable packing means 10 to the disk 2 around the openings 8, so that the gas supplied by the conduit 9 will pass through the openings 8 into the rotor. The relatively movable parts between the conduit 9 and rotor can be readily lubricated.

Disposed between the disks 2 and 3 are the alternate annular plates 11 and 12, of which there may be any suitable number, the plates 11 being flat, while the plates 12 are corrugated. The inner and outer edges of the two sets of plates are preferably flush, and the corrugations 13 of the plate 12 extend along spiral or involute lines from their inner to their outer ends so as to be curved away from the direction in which the rotor revolves, as indicated by the arrow in Fig. 2. The corrugations 13 preferably increase in width from their inner to their outer ends, and provide channels or passages of relatively small cross sectional areas. There are therefore a large number of the channels or passages arranged in annular series side by side. The inner edges of the plates 11 and 12 are spaced from the shaft 5, and their outer edges are spaced slightly from the rims 6.

Resting upon the periphery of the rims 6 is an annular series of overlapped plates or blades 14, which are arranged in spiral or involute positions relative to the rotor, as seen in Fig. 2, and which extend from their inner to their outer edges away from the direction of rotation of the rotor, the same as the corrugations 13, but with a much more pronounced curvature. Indeed, the plates or blades 14 are approximately tangential relative to the periphery of the rotor. These blades 14 are held in place by means of rings 15 secured upon the flanges 7 and overlapping the opposite side edges of the blades 14, as seen in Fig. 1. The blades 14 are provided with channels 16, which are relatively wide and shallow, and which increase in width from their inner to their outer ends. The inner ends of the channels 16 are of approximately the same width as the space between the disks 2 and 3, and said channels extend in the same direction, naturally, as the blades 14 do.

The rotor is provided within the central portion thereof with a gas inlet chamber 17 to which the gas is supplied by way of the openings 8, and from which the gas passes outwardly along the corrugations or channels 13 to the annular combustion chamber 18 between the outer edges of the plates 11—12 and the blades 14. The gas within the combustion chamber 18 can be ignited by one or more spark plugs or other suitable igniters 19.

In operation, to start the turbine, the rotor must be actuated, preferably by rotating the shaft 5, to start the centrifugal action of the gas within the rotor. Thus, when the rotor is rotated in the direction of the arrow in Fig. 2, the gas within the corrugations 13 will be forced outwardly by centrifugal action into the combustion chamber 18, wherein the gas will be brought under compression by this centrifugal action. The gas within the chamber 18 is ignited in any suitable manner, and in expanding will be forced out through the channels 16. The gas can expand when passing out through the channels 16, and impinges against the atmosphere, being delivered tangentially from the rotor, so that the reaction will impart a rotatory movement to the rotor, to continue the operation thereof. Thus, after the turbine is started, it will continue to operate, and the rotor in being revolved will continue the centrifugal action. By the provision of the many and relatively small corrugations or channels 13, the centrifugal action is assisted, and the pressure of the gas within the chamber 18 increased. Furthermore, the centrifugal action of the gas will resist the backward flow thereof from the combustion chamber 18, and the corrugations or channels 13 being of relatively small cross sectional area will prevent the flames from passing into said corrugations or channels, thereby preventing premature ignition. The corrugations or channels 13 are also cooled by the flow of gas therethrough, to prevent overheating.

The present turbine will operate smoothly, and without vibration or jar, and the only moving part is the rotor itself, which has no movable part thereon. The turbine can be used for divers purposes, as will be apparent to those familiar in the art, and the gas within the corrugations or channels 13 being cooled, will be kept below the ignition point.

Having thus described the invention, what is claimed as new is:

1. A gas turbine embodying a rotor having a central gas inlet chamber, channels extending outwardly from said chamber to conduct the gas therefrom by centrifugal action, an annular combustion chamber in communication with the outer ends of said channels, and outlet channels extending from the combustion chamber approximately tangentially of the rotor.

2. A gas turbine embodying a rotor having a central gas inlet chamber, channels extending from said chamber and curved away from the direction of rotation of the rotor, an annular combustion chamber with which the outer ends of said channels communicate, and outlet channels extending from said combustion chamber approximately tangentially relative to the rotor, said channels increasing in size from their inner to their outer ends.

3. A gas turbine embodying a rotor having a central gas inlet chamber, a large number of channels extending outwardly from said chamber of relatively small cross sectional areas to conduct the gas from said chamber by centrifugal action, an annular combustion chamber with which the outer ends of said channels communicate, and an annular series of outlet channels extending from the combustion chamber approximately tangentially relative to the rotor.

4. A gas turbine embodying a rotor having a central gas inlet chamber, a large number of channels extending outwardly from said chamber of relatively small cross sectional areas to conduct the gas from said chamber by centrifugal action, an annular combustion chamber with which the outer ends of said channels communicate, and an annular series of outlet channels extending from the combustion chamber approximately tangentially relative to the rotor, the first mentioned channels being curved away from the direction of rotation of the rotor and increasing in size from their inner to their outer ends, the last mentioned channels being relative wide and shallow and increasing in width from their inner to their outer ends.

5. In a turbine, a rotor comprising a body having a rim and an annular chamber, and an annular series of overlapped blades secured upon said rim and provided with channels extending from said chamber away from the direction of rotation of the rotor.

6. In a turbine, a rotor comprising a body having a rim and an annular chamber between the edges of said rim, the edges of said rim having outturned flanges, an annular series of blades overlapping one another and disposed upon said rim between said flanges, said blades having channels extending from said chamber away from the direction of rotation of the rotor and increasing in width from their inner to their outer ends, and rings secured upon said flanges and overlapping said blades to hold them in place.

7. A turbine embodying a rotor comprising a body having a pair of spaced disks provided at their peripheries with outturned rims, annular plates between said disks providing a central gas inlet chamber, certain of said plates having corrugations extending from their inner to their outer edges to conduct the gas from said chamber by centrifugal action, and an annular series of overlapped blades secured upon said rims and having channels extending away from the direction of rotation of the rotor, there being an annular combustion chamber between the outer edges of said plates and the blades with which the channels communicate.

8. A gas turbine embodying a rotor comprising a body having a pair of spaced disks provided at their peripheries with outturned rims, said rims having outturned flanges at their remote edges, a set of annular plates between said disks providing a central gas inlet chamber, one of said disks having an opening for the inlet of gas to said chamber, certain of said plates having corrugations extending from the inner to the outer edges thereof, said corrugations being curved away from the direction of rotation of the rotor and increasing in width from their inner to their outer ends, an annular series of overlapped plates upon said rims between said flanges, and rings secured upon said flanges and overlapping said blades to hold them in place, there being an annular combustion chamber between said plates and blades, and said blades having channels extending from the combustion chamber away from the direction of rotation of the rotor and increasing in width from their inner to their outer ends.

In testimony that I claim the foregoing as my own, I have hereto affixed my signature in the presence of two witnesses.

FRED BROWN PFEIFFER.

Witnesses:
    Mrs. F. B. PFEIFFER,
    Mrs. C. A. PFEIFFER.